Jan. 9, 1934.  C. F. DISCH  1,942,918
JAR COVER OPENER
Filed April 1, 1933
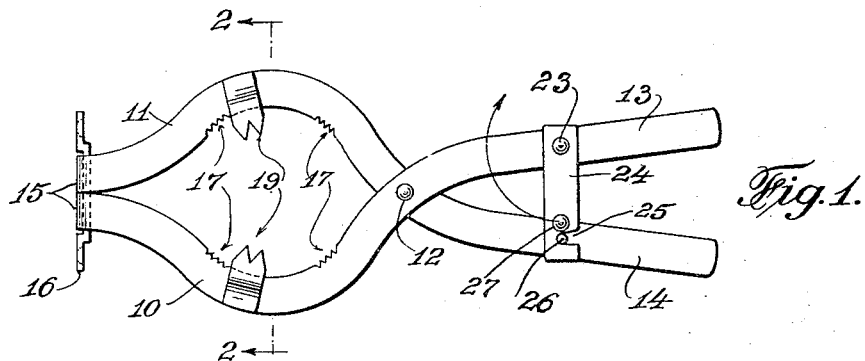
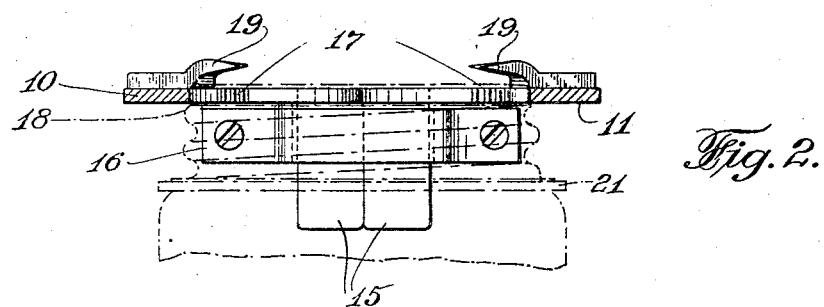
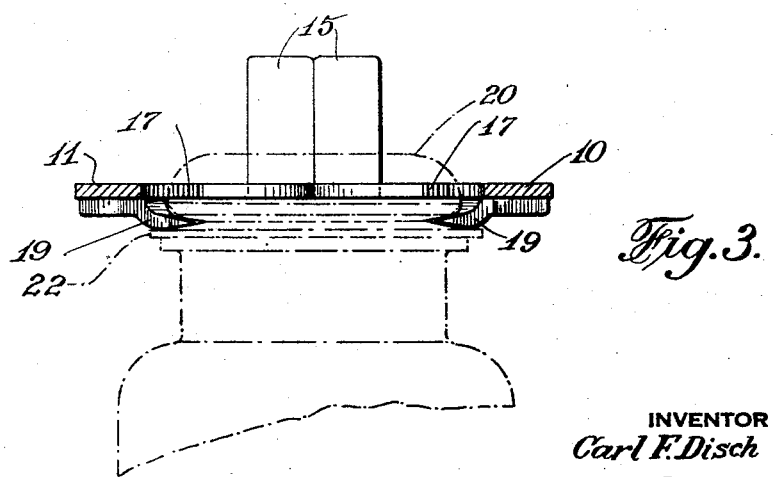
INVENTOR
*Carl F. Disch*
BY
*Paul m Klein*
ATTORNEY Patented Jan. 9, 1934

1,942,918

UNITED STATES PATENT OFFICE 1,942,918

JAR COVER OPENER

Carl F. Disch, West Haven, Conn.

Application April 1, 1933. Serial No. 663,903

2 Claims. (Cl. 81—3.1)

This invention relates to container opening devices in general, and particularly to openers for jar covers.

Devices of this kind are generally known, however, most of them are either too cumbersome and expensive when efficient, or ineffective when made in a cheaper construction.

The present invention has for its object to produce an inexpensive and at the same time efficient article of this kind, which may be used practically indefinitely and for a dual purpose, that is, for either opening screw tops, jar covers, or for prying open glass or similar tops from vacuum-closed jars. These and further objects will become more fully apparent from the following description and the accompanying drawing, forming part of my disclosure, and by no means intended to limit me to the exact showing, and in which Figure 1 is a top view of my device, shown in its closed position.

Figure 2 is an enlarged cross-sectional view, taken on line 2—2 of Figure 1, showing my device in a suspended position, while gripping the cover of a jar, and Figure 3 is a similar cross-sectional view, but in reversed position, illustrating the prying open of a glass top cover from a vacuum-closed jar.

Referring now to the figures, numerals 10 and 11 denote the inwardly and outwardly arcuated jar cover engaging portions of my device, which are hinged at 12 and extend into handle portions 13 and 14, respectively. The ends of engaging portions 10 and 11 terminate in bent attaching ends 15 disposed at right angles to said portions and, which are adapted, when they meet to be slipped behind, and engaged and suspended by a yoke-shaped bracket 16, which is preferably attached to a wall or any other surface. At the inner face of the outwardly arcuated segments of jar engaging portions 10 and 11 are provided spaced groups of serrations 17, adapted to grip the upper end of a screw-fastened cover, shown at 18 in broken lines in Figure 2. Extending inwardly from the top face of the jar engaging portions are bifurcated, wedge-shaped prongs 19, adapted to slip under and pry open the glass cover of a jar, as shown in broken lines at 20, in Figure 3. These prongs are angularly offset relative to the centre of the outwardly arcuated gripping segments, so as to render them operative long before ends 15 abut. As is usual, the jar covers in either case are held tight by rubber gaskets 21 and 22, illustrated, respectively, in Figures 2 and 3.

In Figure 1 it will be observed, that to handle portion 13 is pivotally attached at 23 a locking member 24, provided with a slot 25, adapted to engage a pin 26, secured in handle member 14. The locking member is provided with a handle 27, which extends perpendicularly upwards and is adapted to facilitate the opening and closing of this member.

Operation

When it is desired to remove a screw top cover from a jar, the serrated portions 17 of the device are brought into engagement with the upper end of the cover, and the handle portions 13 and 14 are tightly pressed together until locking member 24 can be closed. Then bent end portions 15 are slipped behind bracket 16. Now the jar is gripped with both hands and unscrewed from the cover, held securely in my device.

When it is desired to remove a glass top, as shown in Figure 3, the device is reversed, so that prongs 19 are directed downwards. These prongs are caused to slip between glass top and gasket 22, whereby the cover is easily pried open.

While I have shown a specific construction of my device, be it understood that changes and improvements may be incorporated therein, without departing from the broad scope of my idea, as covered by the annexed claims.

I claim:

1. In a jar-cover opener, a pair of substantially centrally hinged members, composed of handles and a jar-cover engaging means, the latter comprising outwardly arcuated jar-cover clamping and inwardly arcuated abutting portions, the latter portions terminating in bent attaching ends, said jar-cover clamping portions provided with internal gripping means, a locking element pivoted at one of the handles and adapted to engage the other handle, and means for facilitating the supporting of the opener by way of the bent ends when they meet.

2. In a jar-cover opener, a pair of substantially centrally hinged, cooperating members, composed of handles and jar-cover engaging means, the latter comprising outwardly arcuated jar-cover clamping and inwardly arcuated abutting portions, the latter portions terminating in right angularly bent ends adapted to be held toward one another when the opener engages a jar cover, said jar-cover clamping portions provided with spaced, internal jar-cover gripping means, a handle-locking element pivoted at one of the handles and provided with operating means, the other handle having means for facilitating the engagement of said handle-locking means and a bracket for accommodating and supporting the opener by way of its bent ends, thereby freeing the operator's hands for gripping a jar, the cover of which is engaged by the opener.

CARL F. DISCH.